UNITED STATES PATENT OFFICE.

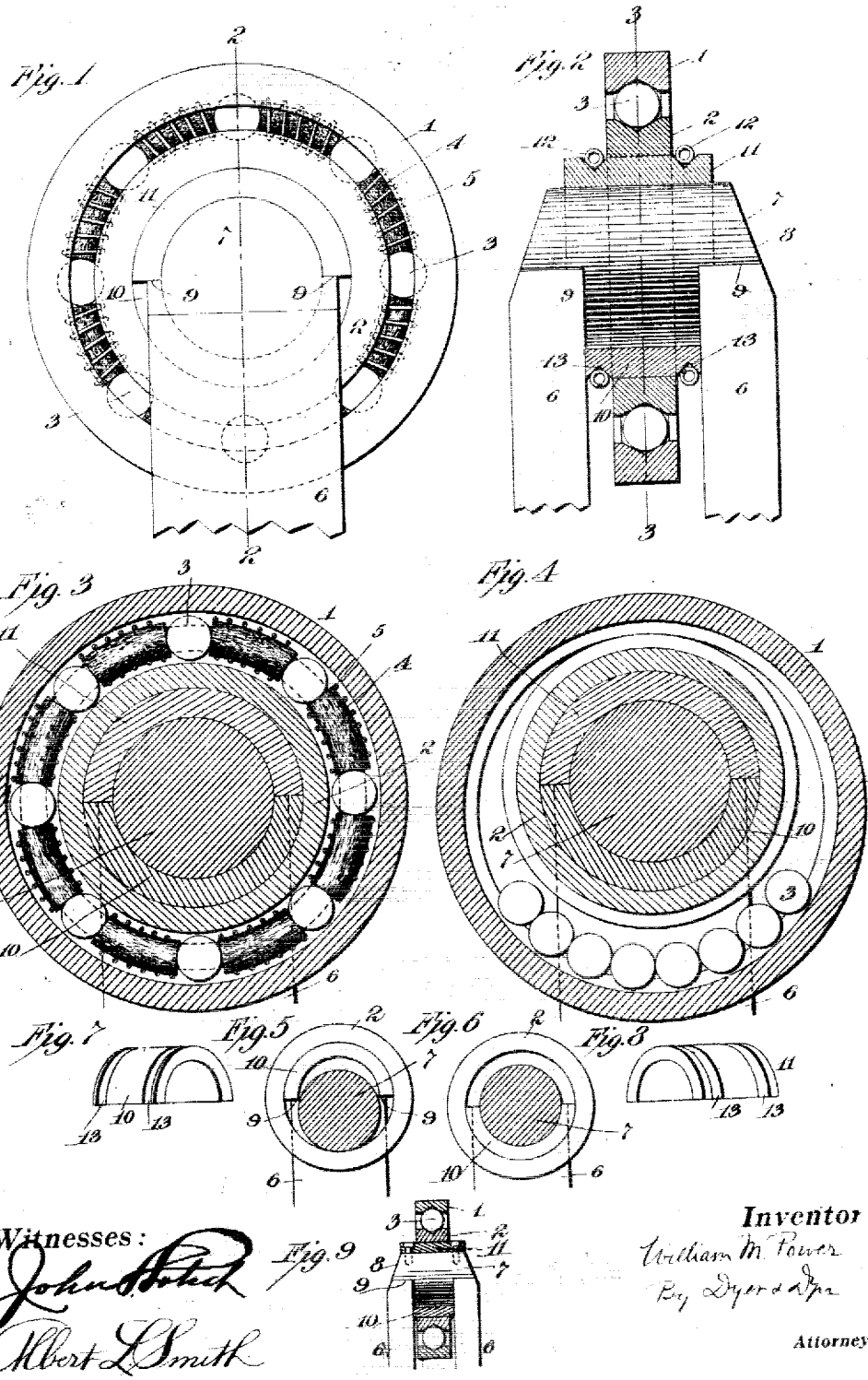

WILLIAM M. POWER, OF PORT CHESTER, NEW YORK.

BALL-BEARING.

No. 864,859.        Specification of Letters Patent.        Patented Sept. 3, 1907.

Application filed April 15, 1905. Serial No. 255,750.

*To all whom it may concern:*

Be it known that I, WILLIAM M. POWER, a citizen of the United States, residing in Port Chester, county of Westchester, State of New York, have invented a certain new and useful Improvement in Ball-Bearings, of which the following is a description.

The object I have in view is the production of a ball bearing for crank shafts, to be applied to shafts in which the web and pin are permanently secured together, the particular object being to reduce the width of the bearing, and do away with enlargements on the pin. I attain these objects by the mechanism illustrated in the accompanying drawings, in which, Figure 1 is a side elevation of a bearing embodying my invention. Fig. 2 is a sectional view thereof taken on the lines 2—2 of Fig. 1, the locking sleeves being shown in elevation. Fig. 3 is a sectional view taken on the line 3—3 of Fig. 2. Fig. 4 is a sectional view similar to that illustrated in Fig. 3 but showing the parts in different positions, as they are assembled. Fig. 5 is a diagrammatic view of the inner ball race, the pin and the lower locking sleeve, in its first position. Fig. 6 is a similar view showing the sleeve in its second position. Fig. 7 is a perspective view of the lower locking sleeve; Fig. 8 is a perspective view of the upper locking sleeve; and Fig. 9 is a sectional view similar to Fig. 2 showing a modification.

In all the views like parts are designated by the same reference characters.

In carrying out my invention I provide a ball bearing similar to that employed in the Mercedes motor. This bearing comprises an outer continuous ball race 1, an inner continuous race 2, and a series of balls 3. As shown in the drawings, eight balls are employed but the number may be varied in accordance with requirements. The balls are separated by cylindrical bodies of felt 4, which contain lubricant, each cylinder of felt being surrounded by a spiral spring 5. The spring structure is sufficiently large to rest within the ball races and will not drop out at the sides, but is sufficiently flexible to be distorted and inserted from the side. The number of balls is so proportioned in relation to their diameter that when bunched together in one part of the ball race they occupy a space less than half the circumference of the ball race, see Fig. 4, so that by removing the felt cylinders and placing the balls together in one side of the race the concentric position of the two races can be changed forming an opening through which the balls can be removed thus demolishing the structure.

This form of ball bearing is very simple, cheap to construct and gives great satisfaction. I propose to employ it in connection with a crank shaft securing it to the pin between the two webs. Heretofore the pin has been provided with an enlarged center, in order to form a foundation for the inner race, the unenlarged portion of the pin permitting the race to be turned from the web to the pin. In order to locate the bearing in the center, the unenlarged portion of the pin must be upon both sides of the enlarged center. This makes a long bearing, which is disadvantageous. By my invention the enlarged center portion of the pin is done away with, and the pin is made much shorter than heretofore. In the drawings, 6, 6, represent the webs, connected together by the pin 7. The pin is of comparatively large size, but not so large as the inner ball race, and is made as short as possible, being but little longer than the width of the bearing. The pin is preferably formed integral with the webs although this is not essential. The ends of the pin and web are beveled at 8, and the diameter of the pin is less than the width of the web, so that the latter extends a short distance on each side thereof forming shoulders or ledges 9, 9, see Fig. 1. These shoulders are preferably formed coincident with the horizontal diameter of the pin, so that half of the pin will be above and the other half below the shoulders, although this is not necessary. Between the inner ball race 2 and the pin are two locking sleeves 10, 11, each semi-cylindrical in shape. The inner sleeve 10 is of a length equal to the separating space between the two webs 6, 6, so that when in place it will be engaged at its ends, with the inner faces of the two webs and will not move longitudinally. The outer sleeve 11 is somewhat longer than the inner sleeve, so that its extremities will rest upon the ledges 9, 9, and rotation be prevented. The sleeves 10 and 11 are adapted to make a tight fit with the inner ball race 2. In order to prevent longitudinal movement of the outer sleeve, spring bands 12, 12, are employed, these bands resting in grooves 13, 13, in the two sleeves. It is to be noted that the grooves 13 in the lower sleeve 10 are nearer the edges than those in the upper sleeve, so that the grooves on the two sleeves will be in alinement.

In order to attach the bearing, the two ball races 1 and 2 with the balls in place, are slipped along one of the webs 6 and placed around the pin. The inner race is sufficiently large to permit this to be done, and the action is facilitated by the inclined or beveled portions 8, 8 of the webs and pin. The bearing is then raised to cause the inner side of the inner race to engage with the bottom of the pin, and the lower sleeve 10 is then inserted above the pin and within the race (see Fig. 5). This sleeve is then turned around until it is under the pin in the position shown in Fig. 6. The upper sleeve 11 is then inserted above the pin and the spring bands 12, 12, placed in position. The bearing may be demolished by reversing the sequence of operation, first taking out the upper sleeve, reversing the position of the lower sleeve, and then removing it.

In cases where extra large balls are used, and wider ball races employed than before described there will not be sufficient room at the sides for the spring bands 12, 12. In this case the upper casing 11 may be secured against sidewise movement by means of screws 14, 14, see Fig. 9. Philister head screws may be employed as shown, and the heads may be countersunk.

What I claim is:—

1. The combination with the integral webs and crank-pin, of a bearing having a single continuous inner ball race and a single continuous outer ball race, with a single row of balls within the race, the races being both grooved to sustain thrust in either direction in addition to the radial load, and semi-cylindrical casings introduced between the pin and ball race for holding the ball race in place.

2. The combination, with the webs and crank pin of a bearing having a single continuous ball race, a single row of balls within the race, and semi-cylindrical casings between the pin and ball race, the said casings extending on both sides of the ball race.

3. The combination, with the integral webs and crank pin, of a bearing having a single continuous ball race, with a single row of balls therein, the races being both grooved to sustain thrust in either direction in addition to the radial load, a casing between the pin and race and separate means for holding the casing from endwise movement.

4. The combination with the webs and crank pin, of a bearing having a continuous ball race, a row of balls therein, a casing between the pin and race, the said casing being in the form of two sleeves, one of said sleeves extending beyond the race on each side.

5. The combination with the webs and crank pin, of a bearing having a continuous ball race, balls therein, and a casing between the pin and race, the said casing being in the form of two sleeves, one of said sleeves engaging with a web to prevent rotation.

6. The combination with the integral webs and crank-pin, of a bearing having a single continuous ball race, a single row of balls therein, the races being grooved to sustain thrust in either direction in addition to the radial load, and a casing between the pin and race, the said casing being cylindrical and without taper.

7. In a ball bearing, the combination with webs and an integral crank pin, the crank pin being of smaller diameter than the width of the webs, so that shoulders are formed thereon, of a bearing having a continuous annular race, balls within the race, and a support therefor intermediate the pin and the race, the said support comprising two semi-cylindrical sleeves, one of said sleeves resting upon the shoulders.

8. In a ball bearing the combination with webs and an integral crank pin, the crank pin being of smaller diameter than the width of the webs, so that shoulders are formed thereon, of a bearing having a continuous annular race, balls within the race, and a support therefor intermediate the pin and the race, the said support comprising two semi-cylindrical sleeves, one of said sleeves resting upon the shoulders, and means for preventing endwise movement of such sleeve.

9. In a ball bearing the combination with webs and an integral crank pin, the crank pin being of smaller diameter than the width of the webs, so that shoulders are formed thereon, of a bearing having a continuous annular race, balls within the race, and a support therefor intermediate the pin and the race, the said support comprising two semi-cylindrical sleeves, one of said sleeves resting upon the shoulders, and means for preventing endwise movement of such sleeve, such means comprising bands surrounding the pin and sleeves.

This specification signed and witnessed this tenth day of April, 1905.

WILLIAM M. POWER.

Witnesses:
LEONARD H. DYER,
JNO. ROBT. TAYLOR.